Patented Jan. 27, 1953

2,626,968

UNITED STATES PATENT OFFICE 2,626,968

EXPANDED PLASTICS

Isaac L. Newell, Wethersfield, Conn., assignor to United Aircraft Corporation, East Hartford, Conn., a corporation of Delaware No Drawing. Application May 5, 1950, Serial No. 160,395

7 Claims. (Cl. 260—724)

The present invention relates to expanded plastics, and more particularly to such plastics which have been formed in the expanded state by means of particularly effective blowing agents.

Objects and advantages of the invention will be set forth in parts hereinafter and in part will be obvious herefrom, or may be learned by practice with the invention, the same being realized and attained by means of the instrumentalities and combinations pointed out in the appended claims.

The invention consists in the novel compositions, steps, and processes herein shown and described.

In forming expanded plastics, in the past, various blowing agents have been used. All of these agents have possessed one or more of the following disadvantages:

1. Toxicity.
2. Toxic decomposition products.
3. Decomposition products would stain.
4. Decomposition below the blow temperature.
5. Chemical or physical incompatibility with the plastic.
6. Decomposition products would react with other ingredients present.

It is an object of the present invention to provide a process in which expanded plastics may be formed without the disadvantages attendant upon the use of the blowing agents previously used.

It is a further object to provide blowing agents which will eliminate the disadvantages possessed by the blowing agents which have been used in the past.

The particular blowing agents which have been found to be especially effective for the stated purposes are organic ammonium nitrites. Compounds which have proven to be particularly effective are di-isopropyl ammonium nitrite, di-isobutyl ammonium nitrite, di-cyclohexyl ammonium nitrite, di-n-butyl ammonium nitrite and di-phenyl ammonium nitrite.

The typical plastics which may be effectively expanded by the use of these compounds are vinyls, rubbers, polystyrene and cellulosics. However, this application is not to be limited to these specifically enumerated plastics, as the nitrites are of universal utility.

The following examples are representative of the results achieved by the use of the processes of this invention:

Example 1

| | Parts by Weight | | | |
|---|---|---|---|---|
| | A | B | C | D |
| Butadiene-acrylonitrile copolymer | 100 | 100 | 100 | 100 |
| Lignin | 40 | 40 | 40 | 40 |
| Zinc Oxide | 10 | 10 | 10 | 10 |
| Barium Sulfate | 30 | 30 | 30 | 30 |
| Polyethylene (di, tri) ricinoleate | 5 | 5 | 5 | 5 |
| Phenolic Resin | 250 | 250 | 250 | 250 |
| Stearic Acid | 5 | 5 | 5 | 5 |
| Glyceryl monoricinoleate | 5 | 5 | 5 | 5 |
| Synthetic Wax (Melting Point, 140° C.) | 2 | 2 | 2 | 2 |
| Hexamethylene tetramine | 6 | 6 | 6 | 0 |
| Diisopropylammonium nitrate | 25 | 30 | 15 | 0 |
| Diisobutylammonium nitrite | 0 | 0 | 0 | 20 |

The above formulae were compounded with ease on a mill and one volume of the compound was placed in a cup having 4 volumes capacity. One volume each of the compound was also placed in cups having 6 and 8 volume capacities. After heating the compound above the blowing temperature for sufficient time, the compound was expanded and the extent of fill of the cups was noted.

| Blow Ratio: | | | | | |
|---|---|---|---|---|---|
| 1:4 | 1 hr. at 225° F. | full | full | full | |
| 1:6 | | do | do | do | |
| 1:8 | | do | ¾ full | ¾ full | |
| 1:6 | 1 day at 70° F. 1 hr. 225° F. | do | full | full | |
| 1:8 | | | | | |
| 1:6 | 1 hr. at 250° F. | | | | ⁹⁄₁₀ full. |
| 1:8 | | | | | Do |
| 1:6 | 1 hr. at 300° F. | | | | Do. |
| 1:8 | | | | | Do. |

Test pieces cut from the foams produced above showed the following physical properties.

| | | | | |
|---|---|---|---|---|
| Cell Structure | very fine—good | very fine—good | very fine—good | very fine—good. |
| Density of foam (lbs./cu. ft.) | 14.8 | 14.4 | | 14.6. |
| Modulus of Elasticity, p. s. i. | 13,250 | 14,800 | | 14,300. |
| Bending Strength, p. s. i. | 336 | 230 | | 356. |
| Softening Point—deflection at 225° F. for 1½ hr. | 0.06 | 0.10 | | 0.23. |
| Compressive Strength (load to produce deflection): | | | | |
| .015″ | 61 lbs./sq. in | 55 lbs./sq. in | | 30 p. s. i. |
| .050″ | 147 lbs./sq. in | 180 lbs./sq. in | | 101 p. s. i. |

Example 2

White Sponge Rubber

| | Parts by Weight | |
|---|---|---|
| | low density | heavy density |
| Pale Crepe Rubber | 100 | 100 |
| Tetra methyl thiuram mono sulfide | 0.3 | 0.3 |
| Sulfur | 2.5 | 2.5 |
| Zinc Oxide | 5.0 | 5.0 |
| Zinc Sulfide | 25.0 | |
| Calcium Carbonate | 30.0 | 30.0 |
| Petrolatum | 5.0 | 5.0 |
| Paraffin Base Petroleum Oil (Saybolt Viscosity, 155 sec. at 100° F.) | 10.0 | 10.0 |
| Diisopropyl Ammonium Nitrate | 5.0 | 2.0 |
| Barium Sulfate | | 30 |

Example 3

| | Parts by weight |
|---|---|
| Polyvinyl chloride | 90 |
| Dicyclohexyl ammonium nitrite | 10 |

Blend together on a hot mill and foam by heating at 350° F.

Example 4

| | Parts by weight |
|---|---|
| Polystyrene | 90 |
| Diisopropyl ammonium nitrite | 10 |

Dissolve the polystyrene in a solvent such as toluene and add the nitrite. Evaporate the solvent at a temperature not exceeding 150° F. Foam by heating at 225° F.

Example 5

| | Parts by Weight | | | | |
|---|---|---|---|---|---|
| | A | B | C | D | E |
| Butadiene-acrylonitrile copolymer | 100 | 100 | 100 | 100 | 100 |
| Lignin | 40 | 40 | 40 | 40 | 40 |
| Zinc Oxide | 10 | 10 | 10 | 10 | 10 |
| Barium Sulfate | 30 | 30 | 30 | 30 | 30 |
| Phenolic Resin | 250 | 250 | 250 | 250 | 150 |
| Polyethylene glycol (di, tri) ricinoleate | 5 | 5 | 5 | 5 | 5 |
| Stearic Acid | 5 | 5 | 5 | 5 | 5 |
| Glyceryl monoricinoleate | 5 | 5 | 5 | 5 | 5 |
| Hexamethylene tetramine | 6 | 6 | 6 | 6 | 6 |
| Di-n-butyl ammonium nitrite | 25 | 0 | 0 | 0 | 0 |
| Dephenyl ammonium nitrite | 0 | 25 | 0 | 0 | 0 |
| Monophenyl ammonium nitrite | 0 | 0 | 25 | 0 | 0 |
| Monoethyl ammonium nitrite | 0 | 0 | 0 | 25 | 0 |
| Tri-n-butyl ammonium nitrite | 0 | 0 | 0 | 0 | 25 |

All of these compounds showed a blow ratio of greater than 1:4 when tested as shown in Example 1.

Example 6

| | Parts by weight |
|---|---|
| Ethyl cellulose | 50 |
| Raw castor oil | 50 |
| Dicyclohexylammonium nitrite | 10 |

This material is mixed on a mill and foamed by heating at 300° F.

It will be noted from the above examples that both aryl, alicyclic and alkyl amine nitrites can be used satisfactorily as blowing agents, and that mono, di, and tri substituted amines may be used. Such substituted amines are useful which do not have a molecular weight in excess of 232. In general the higher the percentage of nitrogen in the compound the greater the blow ratio. The blow temperature depends on the substituted group viz the longer the chain length or larger the substituting group, the higher the temperature required for blowing.

The invention in its broader aspects is not limited to the specific embodiment described but departures may be made therefrom within the scope of the accompanying claims without departing from the principles of the invention and without sacrificing its chief advantage.

What is claimed is:

1. A process of making an expanded plastic selected from the group consisting of rubber and synthetic resins comprising, combining said plastic to be expanded with an organic ammonium nitrite selected from the group consisting of di-isopropyl ammonium nitrite, di-isobutyl ammonium nitrite, di-cyclohexyl ammonium nitrite, di-n-butyl ammonium nitrite, di-phenyl ammonium nitrite, monophenyl ammonium nitrite, monoethyl ammonium nitrite and tri-n-butyl ammonium nitrite, and subjecting said plastic and nitrite to an elevated temperature.

2. A process, as in claim 1, in which the nitrite is monoethyl ammonium nitrite.

3. A process, as in claim 1, in which the nitrite is tri-n-butyl ammonium nitrite.

4. A process, as in claim 1, in which the nitrite is di-isopropyl ammonium nitrite.

5. A process, as in claim 1, in which the nitrite is di-isobutyl ammonium nitrite.

6. A process, as in claim 1, in which the nitrite is di-cyclohexyl ammonium nitrite.

7. A process, as in claim 1, in which the plastic is rubber.

ISAAC L. NEWELL.

REFERENCES CITED

The following references are of record in the file of this patent:

UNITED STATES PATENTS

| Number | Name | Date |
|---|---|---|
| 2,250,192 | Cuthbertson | July 22, 1941 |
| 2,274,262 | Tanberg | Feb. 24, 1942 |
| 2,351,555 | Smith | June 13, 1944 |
| 2,360,049 | Cuthbertson | Oct. 10, 1944 |
| 2,371,707 | Rainier et al. | Mar. 20, 1945 |

Certificate of Correction

Patent No. 2,626,968 January 27, 1953

ISAAC L. NEWELL

It is hereby certified that error appears in the printed specification of the above numbered patent requiring correction as follows:

Column 2, line 26, Example 1, for "nitrate" read *nitrite*; column 3, line 14, Example 2, for "Nitrate" read *Nitrite*;

and that the said Letters Patent should be read as corrected above, so that the same may conform to the record of the case in the Patent Office.

Signed and sealed this 9th day of June, A. D. 1953.

[SEAL]

THOMAS F. MURPHY,
*Assistant Commissioner of Patents.*

Certificate of Correction

Patent No. 2,626,968                                               January 27, 1953

ISAAC L. NEWELL

It is hereby certified that error appears in the printed specification of the above numbered patent requiring correction as follows:

Column 2, line 26, Example 1, for "nitrate" read *nitrite*; column 3, line 14, Example 2, for "Nitrate" read *Nitrite*;

and that the said Letters Patent should be read as corrected above, so that the same may conform to the record of the case in the Patent Office.

Signed and sealed this 9th day of June, A. D. 1953.

[SEAL]

THOMAS F. MURPHY,
*Assistant Commissioner of Patents.*